United States Patent
Volk (10) Patent No.: US 9,879,969 B2
(45) Date of Patent: Jan. 30, 2018

(54) ROUNDNESS AND/OR DIMENSION MEASURING DEVICE

(71) Applicant: JENOPTIK Industrial Metrology Germany GmbH, Villingen-Schwenningen (DE)

(72) Inventor: Raimund Volk, Villingen-Schwenningen (DE)

(73) Assignee: JENOPTIK Industrial Metrology Germany GmbH, Villingen-Schwennigen (DE)

( * ) Notice: Subject to any disclaimer, the term of this patent is extended or adjusted under 35 U.S.C. 154(b) by 176 days.

(21) Appl. No.: 14/983,204

(22) Filed: Dec. 29, 2015

(65) Prior Publication Data

US 2017/0082417 A1    Mar. 23, 2017

(30) Foreign Application Priority Data

Sep. 17, 2015 (DE) .................. 10 2015 115 718

(51) Int. Cl.
*G01B 5/20* (2006.01)
*G01B 5/08* (2006.01)
*B23Q 17/20* (2006.01)

(52) U.S. Cl.
CPC ............. *G01B 5/201* (2013.01); *B23Q 17/20* (2013.01); *G01B 5/08* (2013.01)

(58) Field of Classification Search
CPC .................................. G01B 5/201; G01B 5/08
USPC ................................................ 33/550, 555.1
See application file for complete search history.

(56) References Cited

U.S. PATENT DOCUMENTS

| 3,802,087 A | * | 4/1974 | Raiteri | B24B 49/045 33/501.03 |
| 4,637,144 A | * | 1/1987 | Schemel | B23Q 17/20 33/501.03 |
| 5,761,821 A | * | 6/1998 | Laycock | B23Q 17/20 33/501.05 |
| 6,067,721 A | * | 5/2000 | Dall'Aglio | B24B 5/42 33/555.1 |

(Continued)

FOREIGN PATENT DOCUMENTS

| DE | 696 08 291 T2 | 4/1997 |
| WO | WO 97/12 724 A1 | 4/1997 |
| WO | WO 2003/106 108 A1 | 12/2003 |

OTHER PUBLICATIONS

Sep. 14, 2016 Office Action in DE 10 2015 115 718.7, filed Sep. 17, 2015 (6 pages).

*Primary Examiner* — Christopher Fulton
(74) *Attorney, Agent, or Firm* — Shlesinger, Arkwright & Garvey LLP (57) ABSTRACT

A roundness and/or dimension measuring device for in-process measurement of crank pins during a machining operation on a grinding machine having a base body, and a measuring head, which is connected to the base body via a rod assembly and which is movable between a neutral position and a measuring position. The measuring head has a measuring probe for contacting the crank pin, and the rod assembly is designed and configured in such a way that the measuring head in the measuring position follows orbital rotations of the crank pin. At least one oscillation damping element is operatively associated with the measuring head for holding it in engagement with the crank pin during the orbital rotation.

20 Claims, 8 Drawing Sheets

(56) References Cited

U.S. PATENT DOCUMENTS

| | | | | |
|---|---|---|---|---|
| 6,088,924 | A | 7/2000 | Esteve | |
| 6,430,832 | B1 * | 8/2002 | Dall'Aglio | B24B 5/42 33/555.1 |
| 6,645,047 | B1 * | 11/2003 | Liskow | B24B 5/42 451/11 |
| 6,952,884 | B2 * | 10/2005 | Danielli | B24B 5/42 33/501.02 |
| 7,020,974 | B2 * | 4/2006 | Danielli | B24B 5/42 33/550 |
| 7,690,127 | B2 | 4/2010 | Dall'Aglio et al. | |
| 8,336,224 | B2 * | 12/2012 | Arnold | B24B 5/04 33/555.1 |
| 8,429,829 | B2 * | 4/2013 | Arnold | B24B 5/42 33/555.1 |
| 8,678,879 | B2 * | 3/2014 | Araki | B23Q 17/20 451/49 |
| 9,393,663 | B2 * | 7/2016 | Volk | B24B 49/045 |
| 2016/0221142 | A1 * | 8/2016 | Dall'Aglio | B24B 5/42 |

\* cited by examiner

ROUNDNESS AND/OR DIMENSION MEASURING DEVICE

CROSS-REFERENCE TO RELATED APPLICATIONS

This application claims priority of German Application No. DE 10 2015 115 718.7, filed 17 Sep. 2015, which is incorporated herein by reference.

FIELD OF THE INVENTION

The invention relates to a roundness and/or dimension measuring device for in-process measurement of crank pins during a machining operation on a machining unit, in particular a grinding machine.

BACKGROUND OF THE INVENTION

In the manufacture of crankshafts, it is necessary to grind the crank pins of the crankshaft to the proper dimensions on a grinding machine. To ensure that the grinding operation is terminated as soon as a desired dimension is reached, during the machining operation the crank pin must be continually checked, in particular with regard to its diameter and roundness, within the scope of an in-process measurement method.

Roundness and/or dimension measuring devices for in-process measurement of crank pins during a machining operation on a grinding machine are known.

One disadvantage of known measuring devices is that a high level of wear of measuring components occurs in use.

OBJECTS AND SUMMARY OF THE INVENTION

An object of the invention is overcome the drawbacks of known measuring devices.

Another object of the invention is to provide a roundness and/or dimension measuring device for in-process measurement of crank pins during a machining operation on a machining unit, in particular a grinding machine, in which the wear is reduced.

This object is achieved by the invention set forth herein which includes a roundness and/or dimension measuring device for in-process measurement of crank pins during a machining operation on a grinding machine. The measuring device includes a base body; and a measuring head connected to the base body via a rod assembly and which is movable between a neutral position and a measuring position. The measuring head has a measuring probe for contacting the crank pin, and the rod assembly is configured in such a way that the measuring head in the measuring position follows orbital rotations of the crank pin. At least one oscillation damping element is operatively associated with the measuring head for holding the measuring head in engagement with the crank pin during the orbital rotation.

The invention is based on the finding that the wear which occurs in the known measuring device is based on the fact that the measuring head is held in engagement with the crank pin to be measured, solely by the force of gravity. In other words, the invention is based on the finding that it is disadvantageous for the measuring head to be held in engagement with the crank pin solely by the force of gravity. This finding is based on the following consideration:

In order to measure a crank pin during a machining operation on a grinding machine, using a roundness and/or dimension measuring device (also referred to below as "measuring device" for short) within the scope of an in-process measurement, the measuring head together with the probe must be held in engagement with the crank pin during the orbital motion (orbital rotation) of the same. When a tactile measuring probe is used, a sufficiently large measuring force must be applied. The measuring force results essentially from the moment of inertia of the measuring device and the required acceleration, which is derived from the measuring radius and the measuring frequency. These parameters are also influenced by the localized surface design or configuration of the crank pin, for example in the form of waviness and chatter marks. The measuring force is specified essentially by the radius of the orbital motion and the rotational speed of the orbital rotation. The largest measuring force acts in a kinematic phase in which the measuring head moves upwardly and tangentially perpendicularly, since the static measuring force and the weight force of the measuring head, including the rod assembly, are additive. In a kinematic phase of the orbital rotation in which the measuring head moves downwardly, the static measuring force and the weight force partially cancel one another out.

To ensure proper measurement, however, it is necessary to make sure that the sum of the static measuring force and the weight force always results in a downwardly directed measuring force, so that the measuring head is always held in engagement with the crank pin. The measuring force which results per weight force is thus selected to be at a minimum during the downward movement. This inevitably results in an unintentionally large value of the probing force when the measuring head moves upwardly during the orbital rotation.

However, in the sense of minimizing wear on the measuring device and also on the workpiece, as a result the measuring force should be as small as possible.

Against this background, the invention is based on the concept of reducing the wear in that the measuring head is held in engagement with the crank pin not just by the force of gravity, but also by other suitable design and engineering measures.

On this basis, the invention provides that at least one oscillation damping element is operatively associated with the measuring head for holding it in engagement with the crank pin during the orbital rotations. For example and in particular, a hydraulic oscillation damping element made up of two parts that are movable relative to one another, namely, a piston and a cylinder, may be used as the oscillation damping element. For example and in particular, the cylinder may be articulatedly connected to the base body of the measuring device or the base of a pendulum stroke slide of a pendulum stroke grinding machine which is provided with a measuring device according to the invention, while the piston may be articulatedly connected to the measuring rod assembly, so that during the orbital rotation of the measuring head, the distance between the linkage points changes, and the oscillation damping element thus becomes operative between the rod assembly and the base body of the measuring device.

The damping characteristic is selected in such a way that the oscillation damping element opposes an upwardly directed movement of the measuring head with a small dynamic force, the damper being in its pulling phase. In contrast, the oscillation damping element opposes a downwardly directed movement of the measuring head with a larger dynamic force, the damper being in its pushing phase. In such a configuration, the pulling stage and the pushing stage of the oscillation damping element are thus set differently, so that an optimal value of the damping force may be found for a downwardly directed movement as well as for an upwardly directed movement of the measuring head during its orbital motion. During the downward movement, the dynamic force generated by the oscillation damping element acts in such a way that the resultant measuring force made up of the static measuring force and the weight force is reduced. In contrast, during the upward movement, the oscillation damping element only generates a fairly low dynamic force.

As a result, according to the invention the measuring head is thus held in engagement with the crank pin by the force of gravity and also by the oscillation damping element, whereby the measuring force may be set low enough that it is just sufficient during the upward movement. An excessive increase in the measuring force during the downward movement is prevented by the oscillation damping element due to the downward movement of the measuring head opposing a fairly large dynamic force, so that the resultant of the static measuring force, the weight force, and the dynamic force generated by the oscillation damping element is less than in a device according to the prior art, in which the measuring head is held in engagement with the crank pin solely by the weight force.

Due to the fact that the measuring force may be set lower in the described manner, the wear on the device according to the invention is reduced compared to the device known from the prior art.

A particular advantage of the invention is that the measuring accuracy may be additionally improved. Due to the relative change in position between the base body of the measuring device and the workpiece during the orbital motion of the measuring head, caused by motor operation, on the one hand, and external excitation on the other hand, in practice vibrations occur in the measuring system which may become apparent as measurement error or measurement noise. The movable parts of the measuring device may each be regarded as a rigid body in a first approximation. In reality, however, these parts have only finite rigidity, and thus, relatively low resonant frequencies. If the excitation falls in the resonance range of one or more of the components of the movable measuring device, these resonances are excited, resulting in undesirable natural oscillations having a relatively large amplitude, which may become apparent as measurement errors. In this sense, the movable parts of the measuring device should thus be configured to be as rigid as possible, without the weight increase possibly caused which results in higher acceleration values, and thus, higher probing forces (measuring forces). In addition, in practice there are limitations on measures for improving the structural rigidity, since only a limited spatial area is generally available for the measuring device.

This problem which arises in the measuring device according to the prior art may be addressed at the same time by means of the oscillation damping element provided according to the invention, in that the damper is configured in such a way that it has a relatively low rigidity in the low-frequency range, and has a preferably high rigidity in the high-frequency range. In the high-frequency range, the damper thus represents a mechanical short circuit and acts as a structure-reinforcing element. The natural resonance of the linked measuring rod assembly section is thus increased, so that in many cases the natural resonance is thus no longer excited as strongly, thus reducing the oscillation amplitude.

The portion of the linkage point of the oscillation damping element on the rod assembly should be selected so that this location is not present in an oscillation node of the natural resonances, in particular not in an oscillation node of the fundamental resonance.

In addition to the structure-reinforcing and thus resonance-increasing action of the damper, at the same time, a direct damping effect in the form of its ability to convert vibrational energy into heat has a positive impact. In particular for high frequencies, the damping force is set to be approximately constant. The damping effect thus develops primarily at higher (natural) oscillations of the measuring device. This has positive effects on the vibrations, and thus, on the measuring accuracy.

Thus, due to the oscillation damping element provided according to the invention, it is possible not only to reduce the measuring force, but also to increase the measuring accuracy by avoiding measurement errors caused by oscillations. Another advantage of the measuring device according to the invention is that suitable oscillation damping elements are available as relatively simple, inexpensive standard components, so that the manufacturing costs of a measuring device according to the invention are increased only by a relatively small extent.

The oscillation damping element may have any suitable design. It is thus possible, for example, to associate a spring-coupled free mass with the measuring device, the free mass being selected to be equal or approximately equal to the (effective) mass of the measuring device, and the coupling spring being dimensioned in such a way that the orbital frequency of the orbital motion of the measuring head results as the resonant frequency. An advantageous further embodiment of the invention provides that the oscillation damping element has a first component and a second component which is linearly movable relative to the first component in an oscillation-damping manner, the first component and the second component in each case being connected via a linkage point to a functional element of the measuring device or a grinding machine provided with the measuring device, and the location of the linkage points being selected in such a way that the distance of the linkage points from one another changes during the orbital rotation of the measuring head. A functional element of the measuring device or of a grinding machine provided with the measuring device is understood to mean any component that is involved in the function of the measuring device or the grinding machine.

The configuration, positioning, and number of the oscillation damping element or the oscillation damping elements are selectable within wide limits. In order to configure the measuring device according to the invention in a particularly simple and cost-effective manner, one extremely advantageous further embodiment of the invention provides that at least one oscillation damping element is a hydraulic oscillation damping element. Suitable oscillation damping elements are available as relatively simple and inexpensive standard components.

Another further embodiment of the invention provides that the first component is a piston and the second component is a cylinder.

Another extremely advantageous further embodiment of the invention provides that the damping characteristic of the oscillation damping element is selected in such a way that the oscillation damping element opposes the orbital motion of the measuring head with a smaller dynamic force during the upward movement of the measuring head, and opposes the orbital motion of the measuring head with a larger dynamic force during the downward movement of the measuring head. The terms "smaller" and "larger" refer solely to the relative ratio of the forces to one another, regardless of the absolute values of the forces.

The damping characteristic, i.e., the damping force curve, may in principle be fixed according to the invention, i.e., specified, for example, by the design of the oscillation damping element, whereby in the selection of the oscillation damping element, the damping characteristic is selected so that the effect according to the invention is achieved. One advantageous further embodiment of the invention provides that the damping characteristic of the oscillation damping element is settable. Setting to different circumstances, for example for the measurement of crank pins having different diameters, is thus made possible.

In the embodiment of the oscillation damping element mentioned above, a control apparatus is advantageously associated for setting the damping characteristic.

In the above-mentioned embodiment, a control apparatus for setting the damping characteristic is advantageously associated with the oscillation damping element.

An extremely advantageous further embodiment of the above-mentioned embodiment provides that the control apparatus prevents the damping force of the damping characteristic during the orbital rotation as a function of the particular kinematic phase of the orbital rotation. In this embodiment, particularly accurate adaptation of the dynamic force generated by the oscillation damping element to the particular kinematic phase of the orbital rotation is made possible.

Another advantageous further embodiment of the invention provides that the control apparatus sets the damping characteristic in such a way that a periodically variable damping force curve results during the orbital rotation.

The probe of the measuring head according to the invention may operate according to any suitable functional principle, for example as a contactless probe, for example as an optical or pneumatic probe. Another further embodiment of the invention provides that the probe is a tactile probe, and that the measuring head is a measuring prism for contacting the crank pin to be measured.

Another advantageous further embodiment of the invention provides that the oscillation damping element acts between the base body of the measuring device, or a grinding machine provided with the measuring device, and the rod assembly.

A grinding machine according to the invention is set forth herein. That grinding machine is characterized in that it is provided with at least one measuring device according to the various embodiments of the invention set forth herein.

According to the invention, swiveling in or swiveling out is understood to mean a movement of the measuring head between its neutral position and a measuring position in which the measuring head rests against the test piece to be measured, regardless of the trajectory described by the measuring head during its movement between the neutral position and the measuring position. In particular, the measuring head may move along any given, for example paraboloid, trajectory between its neutral position and its measuring position. The measuring device according to the invention is particularly well suited for in-process measurement of test pieces during a machining operation on a machining unit. However, the measuring device according to the invention is also suitable for carrying out measurements outside a machining operation.

The invention is explained in greater detail below with reference to the appended drawings, in which one embodiment of a roundness and/or dimension measuring device according to the invention is illustrated in highly schematic form. In this regard, all features described in the description, illustrated in the drawings, and claimed in the patent claims, alone or in any suitable combination, constitute the subject matter of the invention, regardless of their recapitulation herein or their reference to various embodiments, and regardless of their description or illustration in the drawings. The subject matter and disclosed content of the present patent application also include subcombinations of the individual features of the embodiments which are added, omitted, or are replaced by other features.

Relative terms such as left, right, up, and down are for convenience only and are not intended to be limiting.

DETAILED DESCRIPTION OF THE INVENTION

Figure 1:
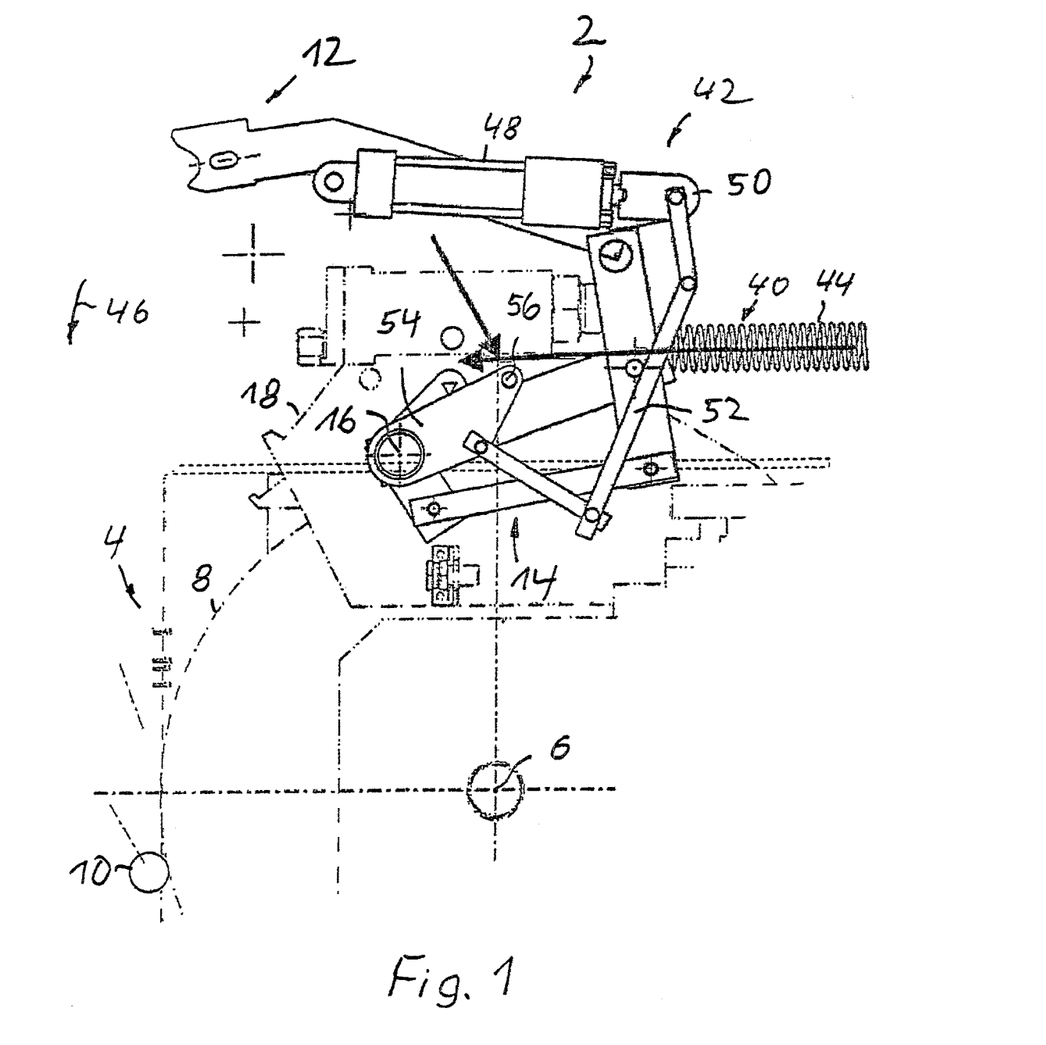
FIG. 1 shows, in a highly schematic illustration, a side view of an illustrative example of a measuring device according to the invention, in a neutral position of the measuring head.

FIG. 1 shows an illustrative example of a roundness and/or dimension measuring device 2 which is used for in-process measurement of test pieces during a machining operation on a grinding machine 4. The grinding machine 4, which for reasons of simplification is only partially illustrated, has a grinding wheel 8 which is rotatable about a rotational axis 6 fixed to the machine, and which is used for machining a test piece, which in this embodiment is formed by a crank pin 10 of a crankshaft.

The measuring device 2 has a measuring head 12 which is connected via a rod assembly 14 to a base body 18 of the measuring device 2 so as to be pivotable about a first pivot axis 16.

The measuring device 2 also has a means, explained in greater detail below, for swiveling the measuring head 12 into a measuring position or swiveling the measuring head out of the measuring position.

Figure 2A:
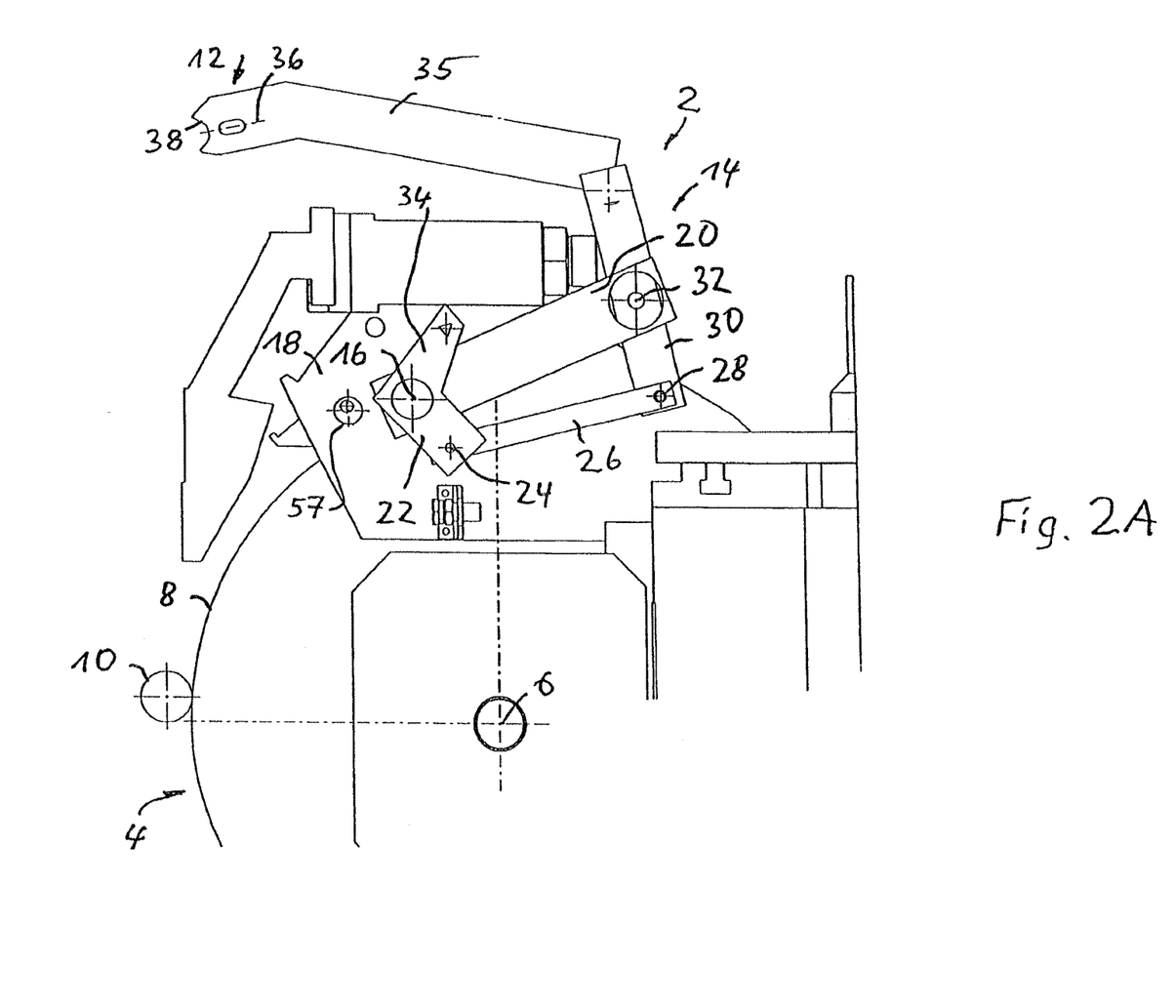
FIG. 2A shows the measuring device according to FIG. 1 in one of its various kinematic phases.

First, the configuration of the rod assembly 14 is explained in greater detail, with reference to FIG. 2A. The means for swiveling the measuring head 12 into the measuring position or swiveling the measuring head out of the measuring position is omitted in FIGS. 2A-2E for reasons of clarity. The rod assembly 18 has a first rod assembly element 20 and a second rod assembly element 22 which are situated so as to be pivotable about the first pivot axis 16. A third rod assembly element 26 is connected to the end of the second rod assembly element 22 facing away from the first pivot axis 16, so as to be pivotable about a second pivot axis 24, the end of the third rod assembly element facing away from the second pivot axis 24 is connected to a fourth rod assembly element 30 so as to be pivotable about a third pivot axis 28, and the fourth rod assembly element 30 is connected to the first rod assembly element 20, at a distance from the third pivot axis 28, so as to be pivotable about a fourth pivot axis 32.

In the illustrative example shown, the first rod assembly element 20 and the third rod assembly element 26 are situated nonparallel to one another, the distance between the first pivot axis 16 and the second pivot axis 24 being smaller than the distance between the third pivot axis 28 and the fourth pivot axis 32.

In the illustrative example shown, the second rod assembly element 22 has a lever arm 34 such that the lever arm 34 together with the rod assembly element 22 forms a two-armed toggle lever, whose function will be explained in greater detail below.

In this illustrative example, the measuring head 12 is situated on a retaining arm 35 which is connected to the fourth rod assembly element 30, which is extended beyond the fourth pivot axis 32. In the illustrated embodiment, the connection between the retaining arm 34 and the fourth rod assembly element 30 has a rigid design. As is apparent from FIG. 2A, in the illustrated embodiment a free end of the retaining arm 34 which holds the measuring head 12 is angled toward the first pivot axis 16, a part of the retaining arm 34 connected to the fourth rod assembly element 30 forming an angle of greater than 90° with respect to the fourth rod assembly element 30.

In the illustrative example shown, the measuring head 12 has a linearly deflectable measuring probe 36, which is indicated by a dashed line in FIG. 2A. In the illustrative example shown, the measuring head 12 also has a measuring prism 38. The manner in which roundness and/or dimension measurements are carried out on a test piece, in particular a crank pin of a crankshaft or some other cylindrical component, by means of an arrangement of a linearly deflectable measuring probe 36 and a measuring prism 38 is generally known to those skilled in the art, and therefore is not explained in greater detail here.

The measuring device 2 also has a means for moving the measuring head 12 from a neutral position into the measuring position, and in this embodiment has a means for swiveling the measuring head 12 in and out and which engages with the rod assembly 14, as explained in greater detail with reference to FIG. 1. In the illustrated embodiment, the means for swiveling the measuring head 12 in and out has a swiveling-in device 40 and a separate swiveling-out device 42.

In the illustrative example shown, the swiveling-in device 40 has a spring means which has a spring 44 designed as a compression spring that acts on the measuring head 12 via the rod assembly 14 in a swiveling-in direction symbolized by an arrow 46 in FIG. 1. In this embodiment, the spring 44 is designed as a compression spring; on its one end it is supported on the base body 18 of the measuring device 2, and on its other end it is supported on the lever arm 34, so that the spring 44 acts on and seeks to move the lever arm 34 in the counterclockwise direction in FIG. 1, and thus acts on and seeks to move the measuring head 12 in the swiveling-in direction 46 by means of the rod assembly 14.

In this illustrative example, the swiveling-out device 42 has a hydraulic cylinder 48 whose piston is connected at its free end to the base body 18 of the measuring device 2. A lever arrangement 42, which in this illustrative example is designed as a toggle lever, is connected to the piston rod 50 of the hydraulic cylinder 48; the free end of the lever arrangement facing away from the piston rod 50 is connected, in an eccentric manner with respect to the first pivot axis 16, to a one-armed lever 54, which is supported coaxially with respect to the pivot axis 16. The lever 54 on its free end has a journal 56 which extends into the plane of the drawing and which loosely acts on the first rod assembly element 20, so that during a movement in a swiveling-out direction, which in the drawing corresponds to a movement in the clockwise direction, the lever 54 functions as a carrier for the first rod assembly element 20.

For sensing the particular position of the measuring head 12, a sensor means is provided which is in operative connection with a control means for controlling the swiveling-in device 40 and the swiveling-out device 42.

The measured values recorded by means of the measuring probe 36 during a measuring operation are evaluated using an evaluation computer. The manner in which such measured values are evaluated is generally known to those skilled in the art, and therefore is not explained in greater detail here.

The mode of operation of the measuring device 2 is as follows:

In the neutral position illustrated in FIGS. 1 and 2A, the measuring head 12 is disengaged from the crank pin 10. In this neutral position, the hydraulic cylinder 48 is stopped, so that a counterclockwise movement of the lever arm 34 in FIG. 1, which the compression spring 44 seeks to achieve, is blocked.

For swiveling the measuring head 12 in the swiveling-in direction 46, the hydraulic cylinder 48 is actuated in such a way that its piston rod 50 extends to the right in FIG. 1. During extension of the piston rod 50, the spring 44 presses against the lever arm 34, so that the lever arm 34 is swiveled counterclockwise in FIG. 2. Since the lever arm 34 is connected to the second rod assembly element 22 in a rotationally fixed manner, the second rod assembly element 22, and thus the entire rod assembly 14, is swiveled counterclockwise in FIG. 2.

Figure 2B:
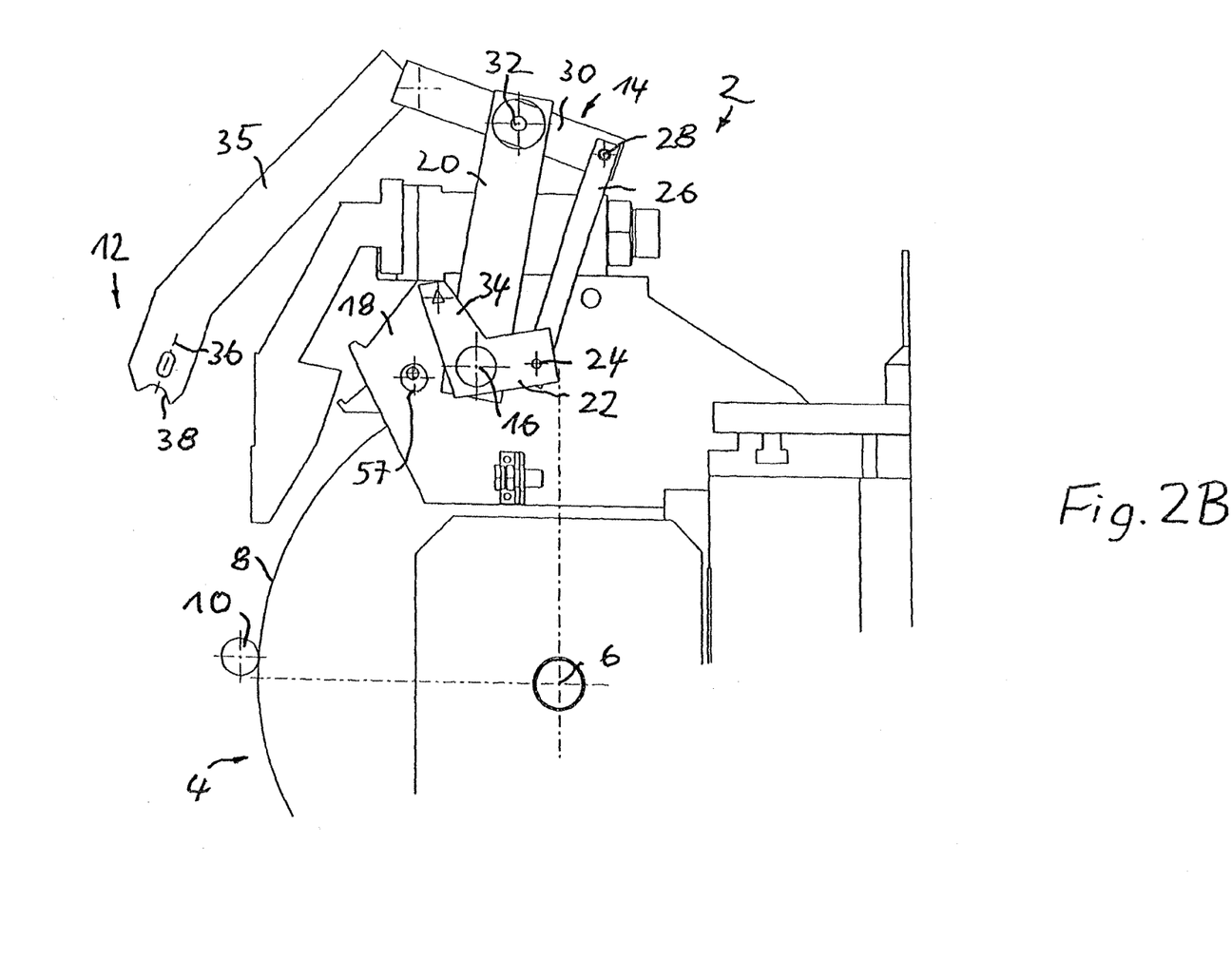
FIG. 2B shows the measuring device according to FIG. 1 in one of its various kinematic phases.

FIG. 2B shows the measuring head 12 in a position between the neutral position and the measuring position.

Figure 2C:
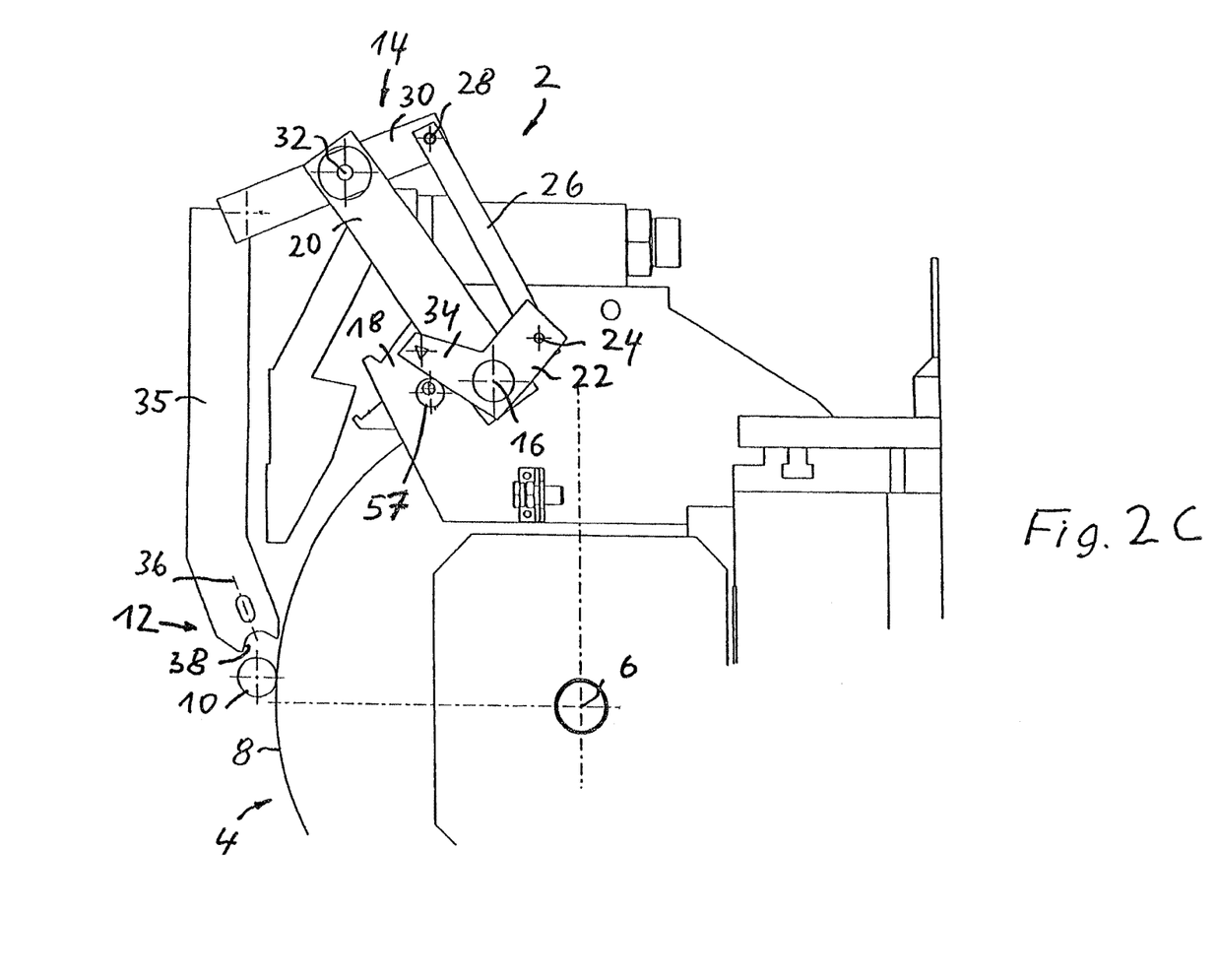
FIG. 2C shows the measuring device according to FIG. 1 in one of its various kinematic phases.

Upon reaching a predetermined angular position illustrated in FIG. 2C, the lever arm 34 runs up against a stop 57, and when the lever arm 34 runs up against the stop 57, a control signal is transmitted to the control means, as a result of which the hydraulic cylinder 48 is stopped. FIG. 2C shows the measuring head 12 in a search position, in which it is not yet in contact with the crank pin 10.

Figure 2D:
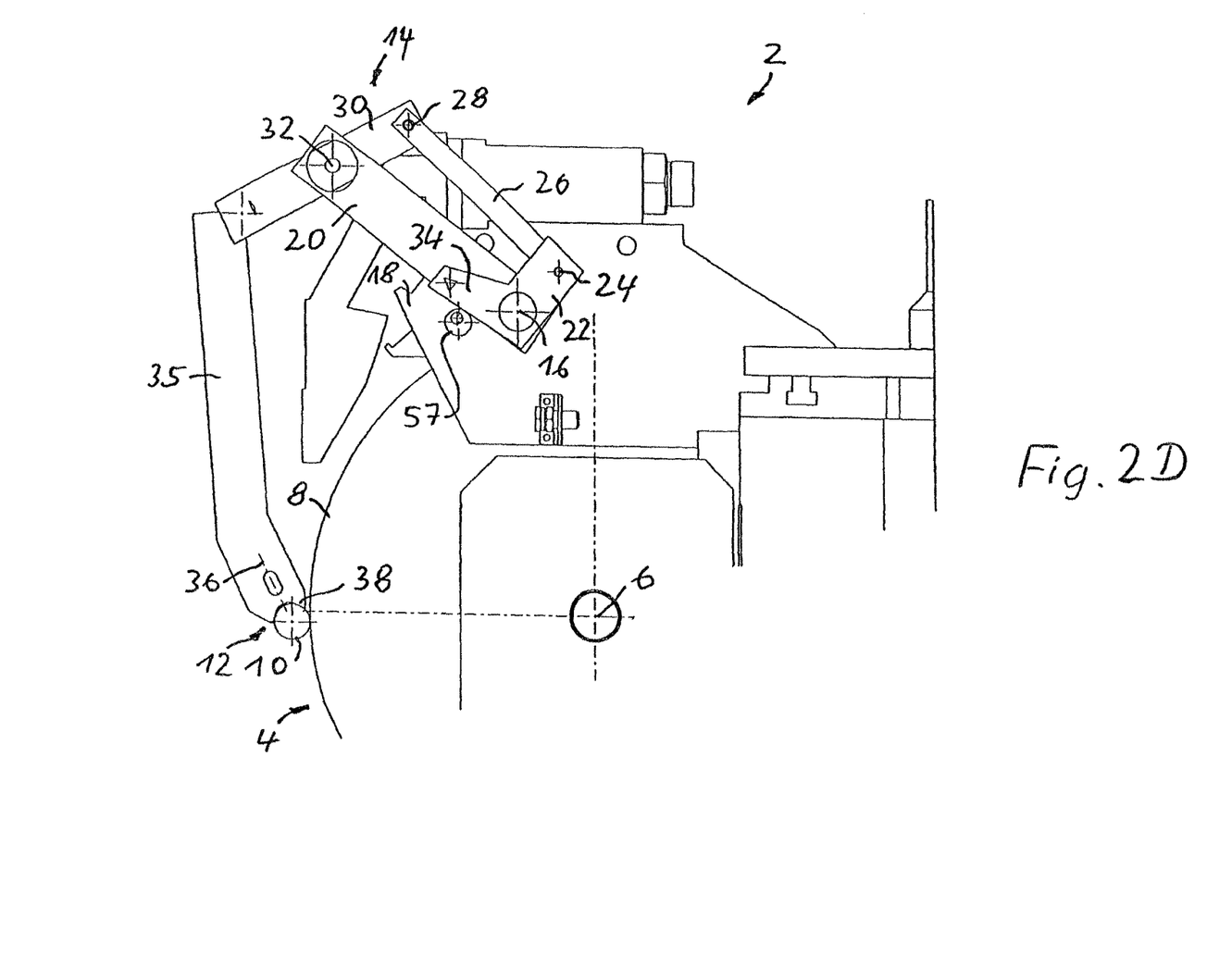
FIG. 2D shows the measuring device according to FIG. 1 in one of its various kinematic phases.

FIG. 2D shows the measuring head 12 in its measuring position, in which it is in contact with the crank pin 10.

Figure 2E:
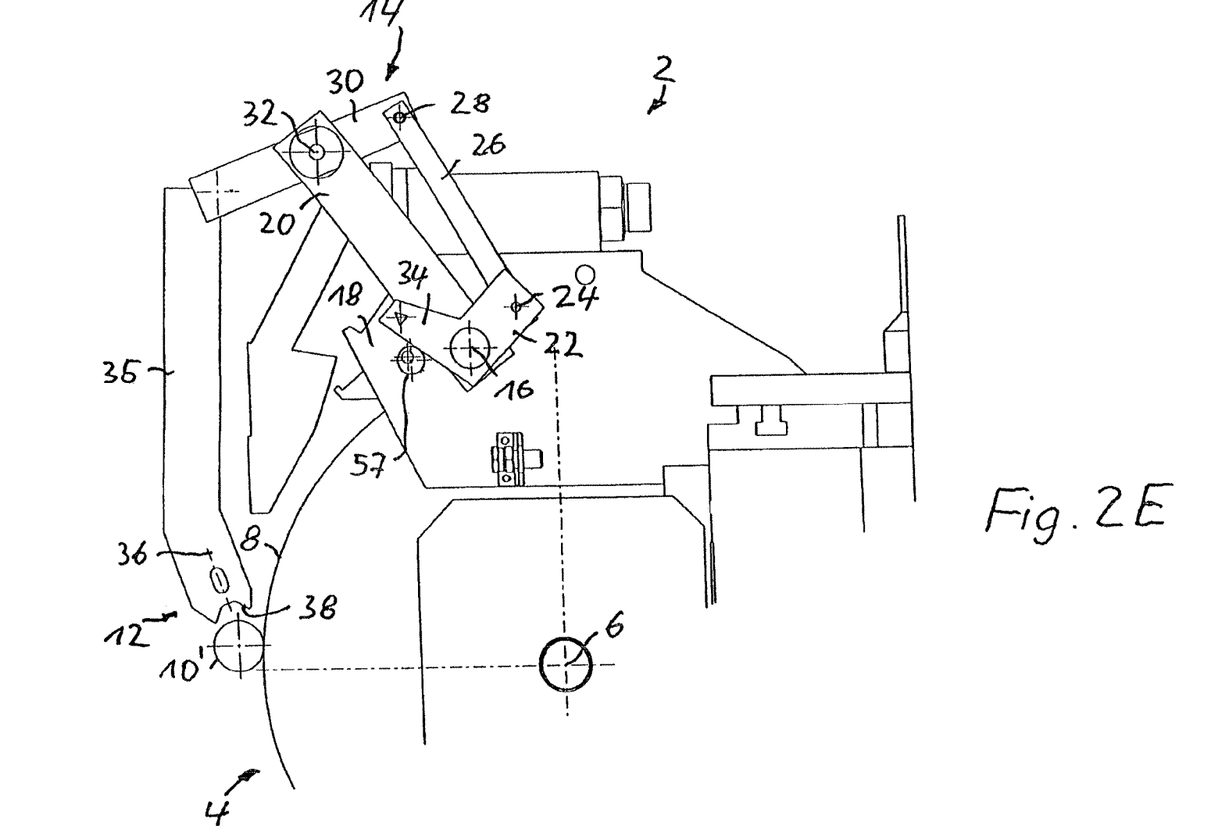
FIG. 2E shows the measuring device according to FIG. 1 in one of its various kinematic phases.

FIG. 2E corresponds to FIG. 2C, with the measuring head 12 illustrated in its search position with regard to a crank pin 10' having a larger diameter.

Figure 3:
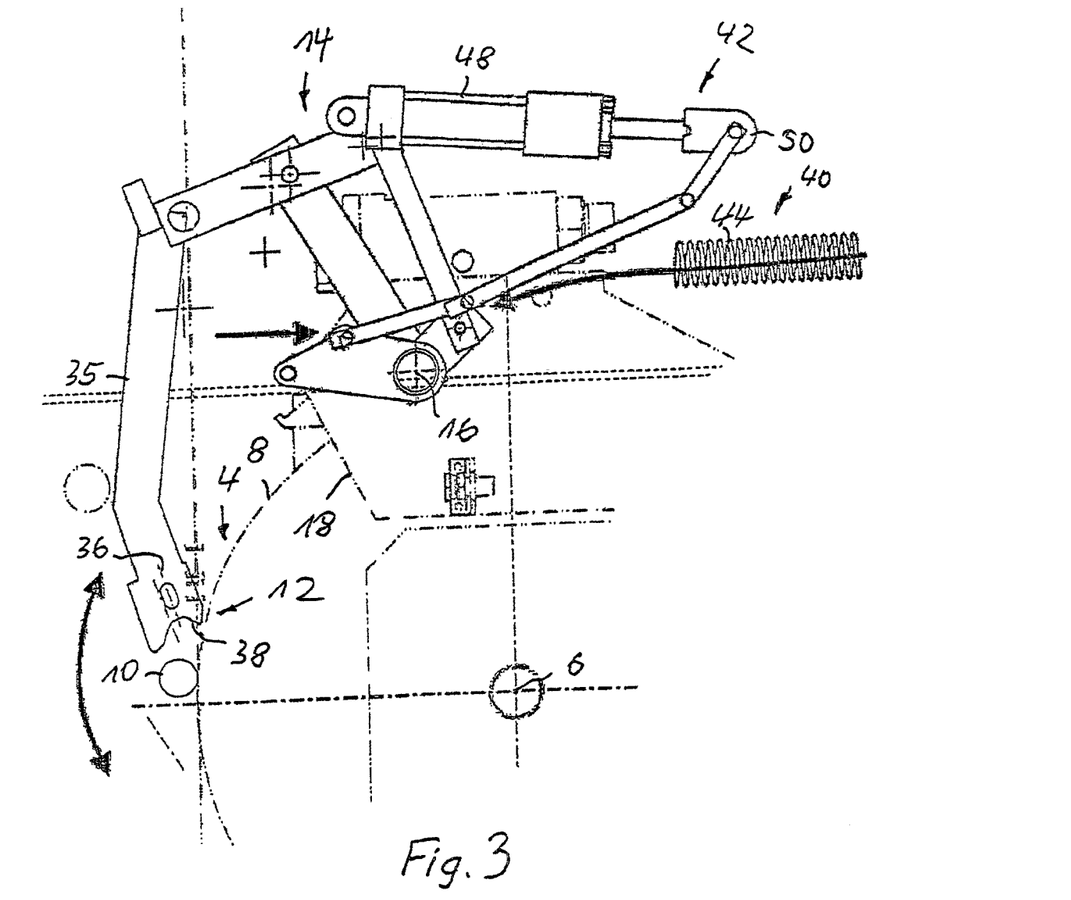
FIG. 3 shows, in the same illustration as FIG. 1, the measuring device according to FIG. 1 during the movement of the measuring head into the measuring position.

FIG. 3 shows the measuring device 2 in the search position of the measuring head 12, which is also illustrated in FIG. 2C. As is apparent from a comparison of FIG. 1 with FIG. 3, the lever 54 is swiveled counterclockwise by means of the lever arrangement 42 when the piston rod 50 of the hydraulic cylinder 48 in FIG. 1 extends, until the angular position of the lever 54 illustrated in FIG. 3 is reached. As is apparent from FIG. 3, in this angular position the journal 56 is situated at a distance from the first rod assembly element 20 in the peripheral direction of the first rotational axis 16, so that the first rod assembly element 20, and thus the entire rod assembly 14, is able to move freely under the effect of the weight force of the measuring head 12, including the retaining arm 34, and the compressive force exerted by the spring 44. In the measuring position (see FIG. 2D), the measuring head 12 rests against the crank pin 10, the measuring head following orbital rotations of the crank pin 10 about the crankshaft during the grinding operation. For this purpose, the base body 18 of the measuring device 2 is non-displaceably connected to a mounting of the grinding wheel 8, so that the measuring device 2 follows translational motions of the grinding wheel 8 in the radial direction of the rotational axis 6.

During the contact of the measuring head 12 with the crank pin 10, the measuring probe 36 records measured values, on the basis of which the roundness and/or the diameter of the crank pin may be assessed in the evaluation computer downstream from the measuring probe 36. When, for example, a certain dimension of the diameter is reached, the grinding wheel 8 is disengaged from the crank pin 10.

In order to swivel out the measuring head 12 opposite the swiveling-in direction 46 after the measurement has concluded, the control apparatus controls the hydraulic cylinder 48 in such a way that the piston rod 50 of the hydraulic cylinder moves to the left in FIG. 3. The lever 54 hereby swivels in the clockwise direction in FIG. 3 by means of the lever arrangement 42. As long as the roller 56 is situated at a distance from the first rod assembly element 20 in the peripheral direction of the first pivot axis 16, the measuring head 12 initially remains in the measuring position. If the roller 56 comes to rest against the first rod assembly element 20 when the lever 54 swivels further about the pivot axis 16 in the clockwise direction in FIG. 3, the lever 54 functions as a carrier upon further swiveling in the clockwise direction, and carries the first rod assembly element 20 and thus the entire rod assembly 14 along in the clockwise direction, so that the measuring head 12 is swiveled out, opposite the swiveling-in direction 46, until the neutral position illustrated in FIG. 1 is reached.

During the measuring operation, the measuring head moves in the peripheral direction of the crank pin 10 with an angular stroke which in the illustrated embodiment is approximately −7° and +5°, thus, 12° overall.

Figure 4:
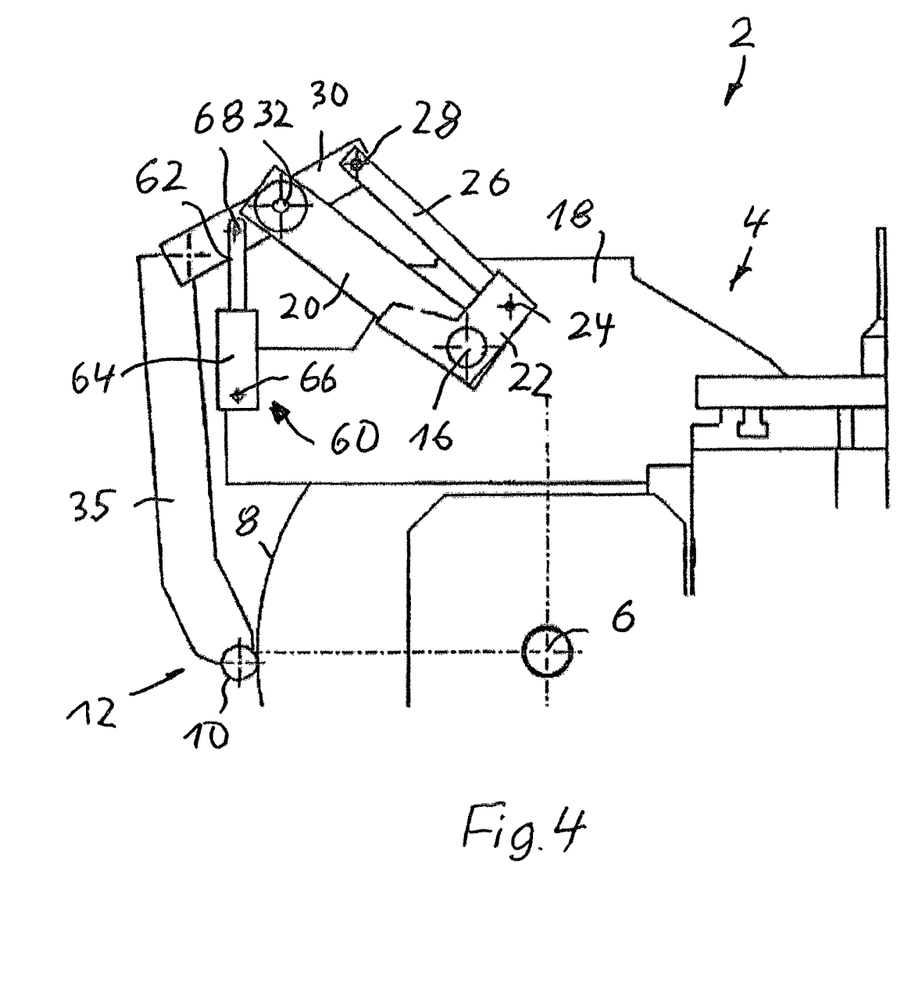
FIG. 4 shows, in the same illustration as FIG. 1, another illustrative embodiment of a measuring device according to the invention.

FIG. 4 illustrates an embodiment of a measuring device according to the invention 2 which differs from the illustrative example according to FIGS. 1 to 3, in that according to the invention, an oscillation damping element 60 is operatively associated with the measuring head 12 for holding same in engagement with the crank pin 10; in this embodiment, the oscillation damping element is designed as a hydraulic oscillation damping element. The oscillation damping element 60 has a piston 62 and a cylinder 64. The design of such a hydraulic oscillation damping element is generally known to those skilled in the art, and therefore is not explained in greater detail here.

The cylinder 64 is articulatedly connected to the base body 18 of the measuring device 2 via a linkage point 66; in this embodiment, the base body is formed by the pendulum stroke slide of the grinding machine 4, which is designed as a pendulum stroke grinding machine. The end of the piston 62 facing away from the cylinder 64 is connected to the fourth rod assembly element 30 at a linkage point 68. It is apparent that the distance between the linkage points 66, 68 changes during the orbital motion of the measuring head 12, so that the oscillation damping element 64 develops its effect during this motion.

The mode of operation of the measuring device 2 according to the invention is as follows:

The oscillation damping element 60 is configured in such a way that it opposes the upward movement of the measuring head 12 during the orbital motion with a smaller dynamic force, the oscillation damping element 60 being in its pulling phase. The oscillation damping element 60 opposes the downward movement of the measuring head 12 with a larger dynamic force, the oscillation damping element 60 being in its pulling phase. In order to provide an optimal value of the dynamic force generated in each case by the oscillation damping element 60, for the downward movement as well as for the upward movement of the measuring head 12, the pulling stage and the pushing stage of the oscillation damping element are thus set differently.

During the downward movement of the measuring head 12, the larger dynamic force generated by the oscillation damping element 60 acts against the resultant of the measuring force and the weight force of the measuring head 12, including the rod assembly 14, so that this force is reduced. In contrast, the oscillation damping element 60 opposes the upward movement of the measuring head 12 during the orbital rotation with only a smaller dynamic force. As a result, the measuring force may be set in such a way that it is just sufficient to ensure proper measurement during the upward movement of the measuring head 12. The measuring force may thus be set lower than for measuring devices from the prior art, so that the wear is reduced compared to the known measuring devices.

Identical or corresponding components are provided with the same reference numerals in the figures of the drawing. FIGS. 2A to 2E show a variant of the embodiment according to FIGS. 1 and 3 which has a slightly modified design, but which is the same as the embodiment according to FIGS. 1 and 3 with regard to the basic principle according to the invention.

If individual parts of words [sic; components] are omitted in the various figures of the drawing for purposes of representation, the components in question in the other figures are to be supplemented accordingly. The features of the individual embodiments or illustrative examples are also exchangeable among the embodiments or illustrative examples; thus, the features disclosed with respect to one embodiment may also be identically or correspondingly provided in the other embodiments or illustrative examples. The features disclosed in the individual embodiments or illustrative examples further embody the particular embodiment or illustrative example taken by itself in each case, i.e., independently of the other features of this embodiment or illustrative example. The subject matter of the invention also includes feature combinations in which features of the embodiment according to FIG. 4 are combined with those of the illustrative example according to FIGS. 1 to 3.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. A roundness and/or dimension measuring device for in-process measurement of crank pins during a machining operation on a grinding machine, the measuring device comprising:
 a) a base body;
 b) a measuring head connected to the base body via a rod assembly and which is movable between a neutral position and a measuring position, the measuring head having a measuring probe for contacting the crank pin, and the rod assembly being configured in such a way that the measuring head in the measuring position follows orbital rotations of the crank pin;
c) at least one oscillation damping element is operatively associated with the measuring head for holding the measuring head in engagement with the crank pin during the orbital rotation; and
d) the damping characteristic of the at least one oscillation damping element is selected in such a way that the oscillation damping element opposes the orbital motion of the measuring head during upward movement of the measuring head with a smaller dynamic force, and opposes the orbital motion of the measuring head during downward movement of the measuring head with a larger dynamic force.

2. The measuring device according to claim 1, wherein:
a) the at least one oscillation damping element has a first component and a second component which is linearly movable relative to the first component in an oscillation-damping manner, the first component and the second component each being connected via a linkage point to a functional element of the measuring device or a grinding machine provided with the measuring device, and the location of the linkage points being selected in such a way that the distance of the linkage points from one another changes during the orbital rotation of the measuring head.

3. The measuring device according to claim 2, wherein:
a) the first component is a piston and the second component is a cylinder.

4. The measuring device according to claim 1, wherein:
a) the at least one oscillation damping element is a hydraulic oscillation damping element.

5. The measuring device according to claim 1, wherein:
a) the damping characteristic of the at least one oscillation damping element is settable.

6. The measuring device according to claim 5, wherein:
a) a control apparatus for setting the damping characteristic is operatively associated with the at least one oscillation damping element.

7. The measuring device according to claim 6, wherein:
a) the control apparatus changes the damping characteristic of the at least one oscillation damping element during the orbital rotation as a function of the particular kinematic phase of the orbital rotation.

8. The measuring device according to claim 6, wherein:
a) the control apparatus sets the damping characteristic of the at least one oscillation damping element in such a way that a periodically variable damping force curve results during the orbital rotation.

9. The measuring device according to claim 1, wherein:
a) the measuring probe is a tactile probe, and the measuring head is a measuring prism for resting against the crank pin to be measured.

10. The measuring device according to claim 1, wherein:
a) the at least one oscillation damping element acts between the base body of the measuring device, and the rod assembly, or the at least one oscillation damping element acts between a grinding machine provided with the measuring device and the rod assembly.

11. A grinding machine, the grinding machine including the measuring device according to claim 1.

12. A roundness and/or dimension measuring device for in-process measurement of crank pins during a machining operation on a grinding machine, the measuring device comprising:
a) a base body;
b) a measuring head connected to the base body via a rod assembly and which is movable between a neutral position and a measuring position, the measuring head having a measuring probe for contacting the crank pin, and the rod assembly being configured in such a way that the measuring head in the measuring position follows orbital rotations of the crank pin;
c) at least one oscillation damping element is operatively associated with the measuring head for holding the measuring head in engagement with the crank pin during the orbital rotation;
d) the damping characteristic of the at least one oscillation damping element is settable;
e) a control apparatus for setting the damping characteristic is operatively associated with the at least one oscillation damping element; and
f) the control apparatus changes the damping characteristic of the at least one oscillation damping element during the orbital rotation as a function of the particular kinematic phase of the orbital rotation.

13. The measuring device according to claim 12, wherein:
a) the measuring probe is a tactile probe, and the measuring head is a measuring prism for resting against the crank pin to be measured.

14. A roundness and/or dimension measuring device for in-process measurement of crank pins during a machining operation on a grinding machine, the measuring device comprising:
a) a base body;
b) a measuring head connected to the base body via a rod assembly and which is movable between a neutral position and a measuring position, the measuring head having a measuring probe for contacting the crank pin, and the rod assembly being configured in such a way that the measuring head in the measuring position follows orbital rotations of the crank pin;
c) at least one oscillation damping element is operatively associated with the measuring head for holding the measuring head in engagement with the crank pin during the orbital rotation;
d) the damping characteristic of the at least one oscillation damping element is settable;
e) a control apparatus for setting the damping characteristic is operatively associated with the at least one oscillation damping element; and
f) the control apparatus sets the damping characteristic of the at least one oscillation damping element in such a way that a periodically variable damping force curve results during the orbital rotation.

15. The measuring device according to claim 14, wherein:
a) the at least one oscillation damping element has a first component and a second component which is linearly movable relative to the first component in an oscillation-damping manner, the first component and the second component each being connected via a linkage point to a functional element of the measuring device or a grinding machine provided with the measuring device, and the location of the linkage points being selected in such a way that the distance of the linkage points from one another changes during the orbital rotation of the measuring head.

16. The measuring device according to claim 14, wherein:
a) the at least one oscillation damping element is a hydraulic oscillation damping element.

17. The measuring device according to claim 14, wherein:
a) the at least one oscillation damping element has a first component and a second component which is linearly movable relative to the first component in an oscillation-damping manner, the first component and the second component each being connected via a linkage point to a functional element of the measuring device or a grinding machine provided with the measuring device, and the location of the linkage points being selected in such a way that the distance of the linkage points from one another changes during the orbital rotation of the measuring head.

18. The measuring device according to claim 17, wherein:
a) the first component is a piston and the second component is a cylinder.

19. A roundness and/or dimension measuring device for in-process measurement of crank pins during a machining operation on a grinding machine, the measuring device comprising:
a) a base body;
b) a measuring head connected to the base body via a rod assembly and which is movable between a neutral position and a measuring position, the measuring head having a measuring probe for contacting the crank pin, and the rod assembly being configured in such a way that the measuring head in the measuring position follows orbital rotations of the crank pin;
c) at least one oscillation damping element is operatively associated with the measuring head for holding the measuring head in engagement with the crank pin during the orbital rotation;
d) a control apparatus for setting the damping characteristic is operatively associated with the at least one oscillation damping element; and
e) the control apparatus changes the damping characteristic of the at least one oscillation damping element during the orbital rotation as a function of the particular kinematic phase of the orbital rotation.

20. The measuring device according to claim 19, wherein:
a) the at least one oscillation damping element is a hydraulic oscillation damping element.

\* \* \* \* \*